(12) United States Patent
Ishikawa

(10) Patent No.: US 12,735,003 B2
(45) Date of Patent: Sep. 15, 2026

(54) DRIVING ASSIST APPARATUS, DRIVING ASSIST METHOD, AND NON-TRANSITORY COMPUTER-READABLE STORAGE MEDIUM

(71) Applicant: TOYOTA JIDOSHA KABUSHIKI KAISHA, Toyota (JP)

(72) Inventor: Toshiaki Ishikawa, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 272 days.

(21) Appl. No.: 18/349,317

(22) Filed: Jul. 10, 2023

(65) Prior Publication Data

US 2024/0083398 A1 Mar. 14, 2024

(30) Foreign Application Priority Data

Sep. 5, 2022 (JP) ................................ 2022-140729

(51) Int. Cl.
*B60T 7/12* (2006.01)
*B60W 30/09* (2012.01)
*B60W 30/095* (2012.01)
*G08G 1/16* (2006.01)

(52) U.S. Cl.
CPC ............... *B60T 7/12* (2013.01); *B60W 30/09* (2013.01); *B60W 30/0956* (2013.01); *G08G 1/166* (2013.01)

(58) Field of Classification Search
CPC . B60T 7/12; B60T 7/22; B60W 30/09; B60W 30/0956; G08G 1/166
See application file for complete search history.

(56) References Cited

U.S. PATENT DOCUMENTS 6,070,682 A * 6/2000 Isogai ................ B60K 31/0008 701/70
7,395,144 B2 * 7/2008 Isaji .......................... B60T 7/22 340/436
8,010,274 B2 * 8/2011 Sawada ................. B60W 30/16 701/79
9,105,190 B2 8/2015 Akiyama
9,248,811 B2 * 2/2016 Kato ......................... B60T 7/22
9,393,960 B2 7/2016 Kodaira
(Continued)

FOREIGN PATENT DOCUMENTS

DE 102012006340 A1 * 11/2012 ......... B60G 17/0164
JP 2010006231 A * 1/2010
JP 2014-000926 A 1/2014

*Primary Examiner* — Peter D Nolan
*Assistant Examiner* — Demetra R Smith-Stewart
(74) *Attorney, Agent, or Firm* — Sughrue Mion, PLLC

(57) ABSTRACT

A driving assist apparatus comprises a sensor for detecting an object located in front of a vehicle and moving in the same direction as the vehicle, and a controller for executing a brake control for applying a brake force to the vehicle during a time from a time point at which the obstacle satisfies a predetermined start condition to a time point at which a predetermined end condition is satisfied. The controller is configured to set a target stop distance such that the target stop distance increases as a relative speed of the object with respect to the vehicle increases when the controller executes the brake control, and apply the brake force so that the vehicle stops when a distance between the object and the vehicle coincides with the target stop distance.

6 Claims, 5 Drawing Sheets

(56) References Cited

U.S. PATENT DOCUMENTS

| | | | | |
|---|---|---|---|---|
| 9,483,945 | B2 | 11/2016 | Okita et al. | |
| 9,873,412 | B2 | 1/2018 | Moriizumi | |
| 10,793,147 | B2 | 10/2020 | Kaminade et al. | |
| 11,420,601 | B2 * | 8/2022 | Yasui | B60W 30/06 |
| 2007/0276574 | A1 * | 11/2007 | Isaji | B60T 7/22 701/96 |
| 2018/0281791 | A1 * | 10/2018 | Fukaya | B60W 30/095 |
| 2019/0176794 | A1 * | 6/2019 | Pinto, IV | B60T 7/18 |
| 2021/0061309 | A1 | 3/2021 | Kawanai | |
| 2021/0107521 | A1 | 4/2021 | Fujita et al. | |
| 2021/0107528 | A1 | 4/2021 | Fujita et al. | |
| 2021/0146956 | A1 | 5/2021 | Fujita et al. | |
| 2021/0146958 | A1 | 5/2021 | Tanaka et al. | |
| 2023/0331204 | A1 * | 10/2023 | Yamamoto | B60T 8/172 |
| 2025/0050878 | A1 * | 2/2025 | Hong | B60W 30/16 |

* cited by examiner

DRIVING ASSIST APPARATUS, DRIVING ASSIST METHOD, AND NON-TRANSITORY COMPUTER-READABLE STORAGE MEDIUM

TECHNICAL FIELD

The present disclosure relates to a driving assist apparatus configured to execute a brake control for applying a brake force to a vehicle when an object satisfies a predetermined start condition.

BACKGROUND

Conventionally, there has been known a driving assist apparatus configured to determine that an object satisfies a start condition when a possibility that the object collides with a vehicle is high, and executes a brake control. For example, the driving assist apparatus described in Patent Literature 1 (hereinafter, referred to as a "conventional apparatus") executes the brake control when a collision required time (TTC: Time to Collision) which it takes for the vehicle to collide with the object is equal to or smaller than a threshold T0.

More specifically, the conventional apparatus reduces the brake force as the collision required time increases. Further, the conventional apparatus sets an end timing of the brake control to an avoidance timing when the collision required time is long, and sets the end of the brake control to a stop timing when the collision required time is short.

Patent Literature 1: Japanese Patent Application Laid-Open No. 2014-926

SUMMARY

The Patent Literature 1 does not describe a target stop distance. The target stop distance is a distance between the vehicle and the "object satisfying the start condition" in a case where the brake control makes the vehicle stop.

The inventor of the present disclosure has been studying/developing a driving assist apparatus (hereinafter referred to as a "prototype apparatus"). The prototype apparatus executes the brake control so that the vehicle stops when the distance between the vehicle and the object becomes equal to the target stop distance.

In the above prototype apparatus, the target stop distance is set in advance to a relatively small value in order to prevent the vehicle from colliding with the following vehicle by performing a rapid deceleration. However, in a case where the target stop distance is set to the small value, the possibility that the vehicle collides with the object is high when the object decelerates rapidly.

On the other hand, in a case where the target stop distance is set to a relatively large value, a possibility the vehicle decelerates rapidly is high so that a possibility that the vehicle collides with the following vehicle is high.

The present disclosure has been made to address the above-described problem. That is, an object of the present disclosure is to provide a driving assist apparatus that executes the brake control such that the vehicle stops when the distance between the object located in front of the vehicle (for example, a preceding vehicle) and the vehicle becomes equal to the target stop distance, and can reduce possibilities of collision with the object in front of the vehicle and the following vehicle by setting the target stop distance to an appropriate value.

The driving assist apparatus of the present disclosure (hereinafter, referred to as "the present apparatus") comprises:

a sensor (22) for detecting an object located in front of a vehicle (VA) and moving in the same direction as the vehicle; and a controller (20) for executing a brake control for applying a brake force to the vehicle (step 400 to step 495) during a time from a time point at which the obstacle satisfies a predetermined start condition (step 325: Yes) to a time point at which a predetermined end condition is satisfied (step 335: Yes, step 345: Yes).

The controller is configured to:

set a target stop distance such that the target stop distance increases as a relative speed of the object with respect to the vehicle increases (step 415) when the controller executes the brake control (step 405: Yes); and apply the brake force such that the vehicle stops when a distance between the object and the vehicle coincides with the target stop distance (step 425).

According to the present apparatus of the present disclosure, the target stop distance increases as the relative speed increases. This can reduce a possibility that the vehicle will collide with a "rapidly decelerated front object" when the relative speed is large, and can reduce the possibility that the vehicle collide with a following vehicle when the relative speed is small.

DETAILED DESCRIPTION

Figure 1:
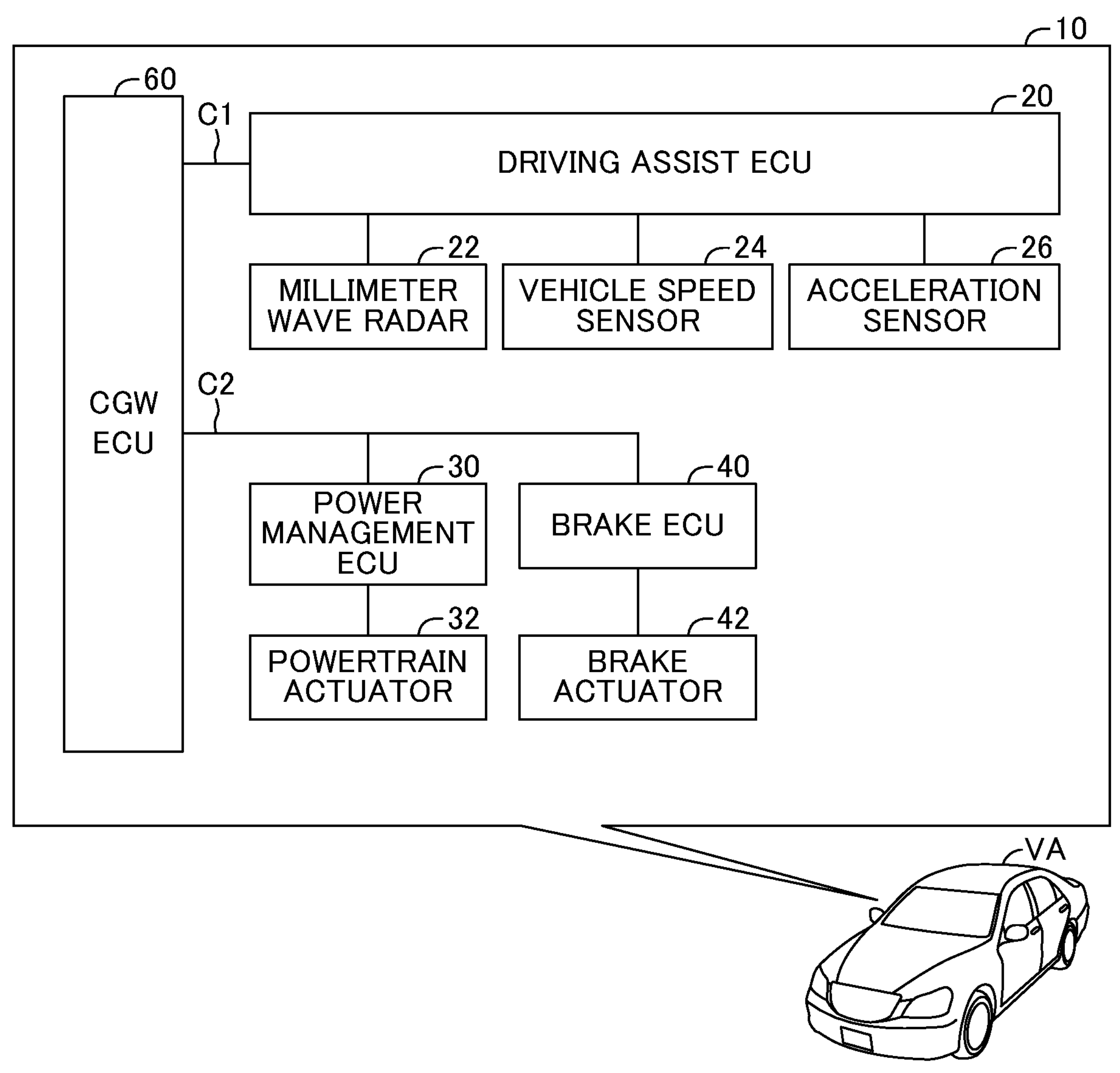
FIG. 1 is a schematic system configuration diagram of a driving assist apparatus according to an embodiment of the present disclosure.

The driving assist apparatus (the assist apparatus 10) according to the embodiment of the present disclosure is applied to a vehicle VA and includes components illustrated in FIG. 1.

A driving support ECU is a ECU that executes a driving assist control, which is a kind of automatic driving control, and is hereinafter referred to as "ECU20".

In the present specification, an "ECU" is an electronic control unit including a microcomputer as a main part. The ECU is also referred to as a controller. The microcomputer includes a CPU (processor), a ROM, a RAM, an interface, and the like. The ECU20 and at least one of the ECUs described below may be integrated into one ECU.

A millimeter wave radar 22 obtains object information of an object located in front of the vehicle VA, and transmits the object information to the ECU20. The object information includes information related to (1) to (4) below.

(1) A distance D from the vehicle VA to the object (hereinafter referred to as "vehicle-to-vehicle distance D").

(2) A lateral position L of the object with respect to the vehicle VA (3) A relative speed Vr of the object with respect to the vehicle VA (4) A type of the object (a vehicle, a pedestrian, a two wheeled vehicle, or the like)

A vehicle speed sensor 24 detects a speed of the vehicle VA (a vehicle speed Vs). An acceleration sensor 26 detects an acceleration G of the vehicle VA. The ECU20 receives detection values from these sensors 24 and 26.

A power management ECU30 is connected to a powertrain actuator 32 and controls the powertrain actuator 32. The powertrain actuator 32 changes a driving force generated by a driving device (for example, an internal combustion engine and/or an electric motor) of the vehicle VA.

A brake ECU40 is connected to a brake actuator 42 and controls the brake actuator 42. The brake actuator 42 controls a brake force applied to the vehicle VA.

A CGW (control gateway) ECU60 controls transmission and reception of data between the plurality of ECUs via the first communication line C1 and the second communication line C2.

(Operation)

An operation of the ECU20 of the assist apparatus 10 will be described.

The ECU20 executes a brake control during a period from a time point at which a later-described start condition is satisfied to a time point at which a later-described end condition is satisfied.

In the brake control, the ECU20 transmits a target deceleration Gtgt to the power management ECU30 and the brake ECU40. The target deceleration Gtgt is a deceleration which makes the vehicle VA stop when the inter-vehicle distance D becomes equal to the target stop distance Dtgt. The inter-vehicle distance D represents a distance between the vehicle VA and a "front object satisfying the start condition". The front object is a moving object that moves in front of the vehicle VA in the same traveling direction as the vehicle VA. For examples, the front object is a preceding vehicle that travels in the same lane as the vehicle VA and is located within a predetermined distance in front of the vehicle VA. It should be noted that an oncoming vehicle is not the front object. The front object may be limited to an object in which the type of the object is a "vehicle".

The power management ECU30 and the brake ECU40 control the powertrain actuator 32 and the brake actuator 42 so that the acceleration G coincides with the target deceleration Gtgt, respectively.

The ECU20 determines the target stop distance Dtgt such that the target stop distance Dtgt increases as the relative speed Vr increases. Specifically, the ECU20 determines the target stop distance Dtgt by applying the relative speed Vr to the target stop distance map MapDtgt(Vr) shown in FIG. 2. It should be noted that the relative speed Vr is a positive value when the front object approaches the vehicle VA.

Figure 2:
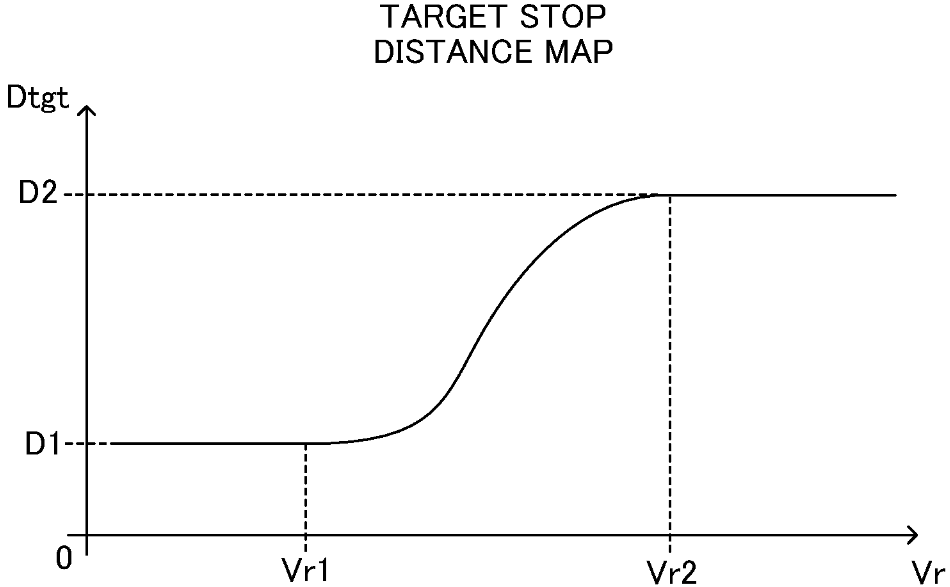
FIG. 2 is an explanatory diagram of a target stop distance map.

The target stop distance map MapDtgt(Vr) defines a relation between the target stop distance Dtgt and the relative speed Vr. The target stop distance map MapDtgt(Vr) is stored in the ROM of the ECU20. As shown in FIG. 2, the target stop distance map MapDtgt(Vr) defines the relation such that the target stop distance Dtgt increases as the relative speed Vr increases. Specifically, if the relative speed Vr is smaller than a "Vr1", the target stop distance Dtgt becomes "D1", and if the relative speed Vr is larger than a "Vr2(>Vr1)", the target stop distance Dtgt becomes a "D2 (>D1)". When the relative speed Vr is larger than or equal to the "Vr1" and smaller than or equal to the "Vr2", the target stop distance Dtgt increases as the relative speed Vr increases.

Here, a distance which the vehicle VA travels until the vehicle speed Vs coincides with a speed of the front object when the front object is rapidly decelerated is referred to as a "braking distance". The braking distance is longer when the relative speed Vr is larger than when the relative speed Vr is small.

A distance which the vehicle VA travels until the vehicle VA stops is longer when the target stop distance Dtgt is short than when the target stop distance Dtgt is long. Therefore, a possibility that the vehicle VA decelerates rapidly is smaller when the target stop distance Dtgt is short than when the target stop distance Dtgt is long. Accordingly, a possibility that the vehicle VA collides with the following vehicle decreases as the target stop-distance Dtgt decreases.

From these two viewpoints, the assist apparatus 10 according to the present embodiment determines the target stop distance Dtgt such that the target stop distance Dtgt increases as the relative speed Vr increases and the target stop distance Dtgt decreases as the relative speed Vr decreases. As a result, when the relative speed Vr is large, the distance between the front object and the vehicle VA becomes long. Therefore, the possibility that the vehicle VA collides with the "rapidly decelerated front object" can be reduced. When the relative speed Vr is small, the distance between the front object and the vehicle VA becomes short. Therefore, the possibility that the vehicle VA decelerates rapidly decreases. Accordingly, the possibility that the vehicle VA collides with the following vehicle can be reduced.

Start Condition

Condition S1: The front object is present.

Condition S2: A collision required time of the front object (hereinafter referred to as "TTC") is smaller than or equal to a predetermined start threshold time Tsth.

The TTC is a time which it takes for the vehicle VA to collide with the front object. The ECU20 obtains the TTC by dividing the inter-vehicle distance D of the front object by the relative speed Vr of the front object.

The ECU20 determines that the start condition is satisfied when both the condition S1 and the condition S2 are satisfied.

End Condition

Condition E1: The vehicle speed Vs becomes 0 km/h (that is, the vehicle VA stops).

Condition E2: The TTC of the front object is smaller than or equal to a predetermined end threshold time Teth.

The end threshold time Teth has been set to a larger value than the start threshold time Tsth.

When any one of the conditions E1 and E2 is satisfied, the ECU20 determines that the end condition is satisfied.

(Specific Operation)

Figure 3:
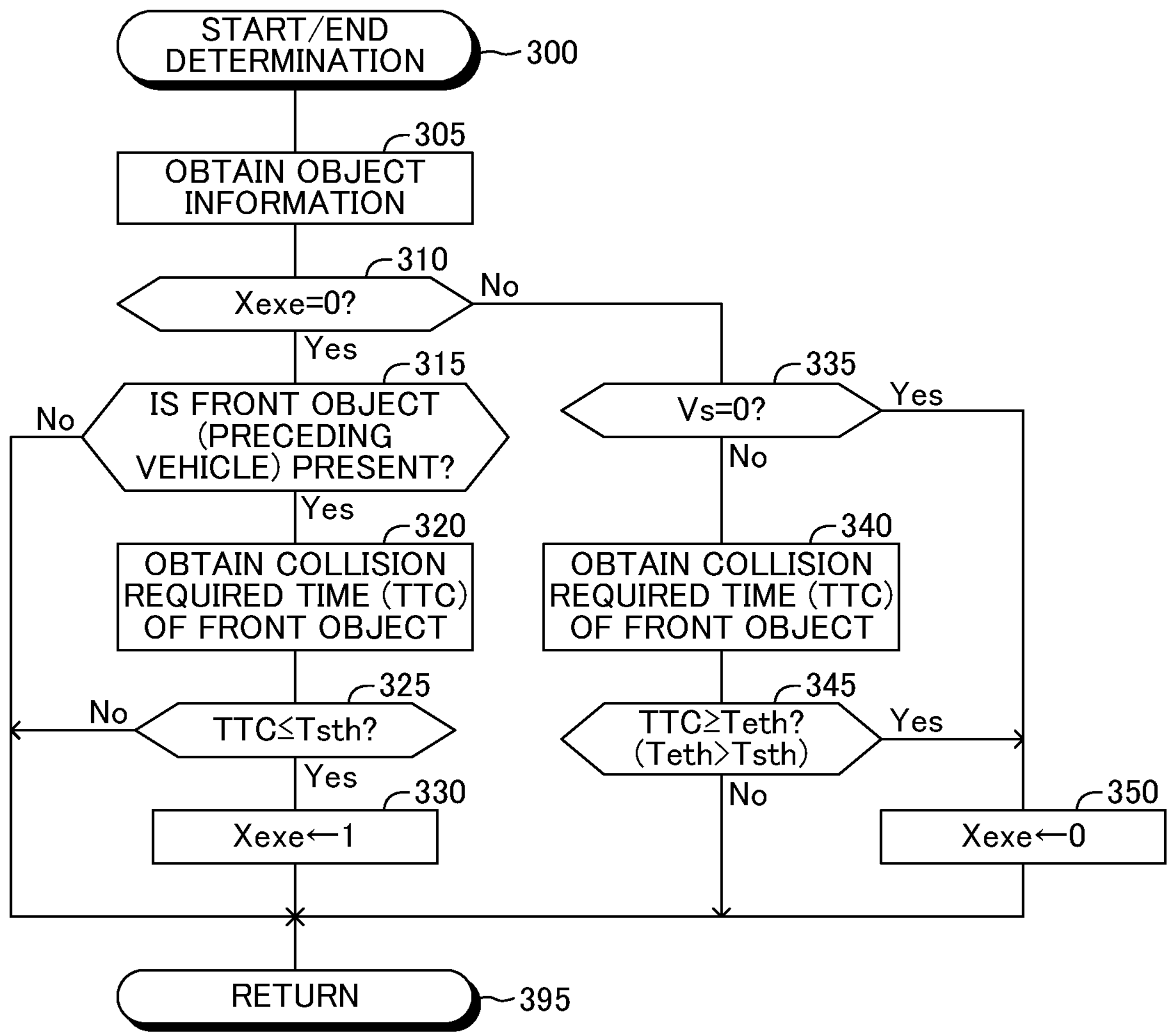
FIG. 3 is a flowchart of a program executed by a CPU of a driving assist ECU.
Figure 4:
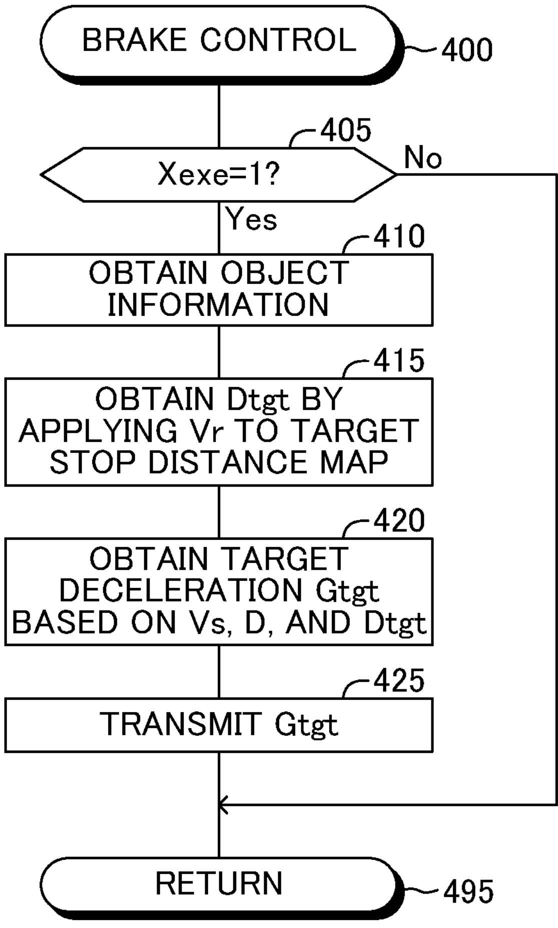
FIG. 4 is a flowchart of a program executed by the CPU of the driving assist ECU.

A CPU of ECU20 is executed routines shown by flowcharts in FIG. 3 and FIG. 4 every time a predetermined time elapses.

<Start/End Determination Routine>

Accordingly, when an appropriate time point has arrived, the CPU starts a process from step 300 of FIG. 3 and executes step 305 and step 310.

Step 305: The CPU obtains the object information from the millimeter wave radar 22.

Step 310: The CPU determines whether or not an execution flag Xexe is "0".

The execution flag Xexe is set to "1" when the start condition is satisfied, and is set to "0" when the end condition is satisfied. The execution flag Xexe is also set to "0" in an initialization routine. The initialization routine is executed by the CPU when an ignition key switch (not shown) of the vehicle VA is changed from an off-position to an on-position.

When the execution flag Xexe is “0”, the CPU makes a “Yes” determination in step 310 and the process proceeds to step 315. In step 315, the CPU determines whether or not the front object is present based on the object information.

When no front object is present, the CPU makes a “No” determination in step 315. Thereafter, the process proceeds to step 395, and the CPU terminates the present routine tentatively.

When the front object is present, the CPU makes a “Yes” determination in step 315 and performs steps 320 and 325.

Step 320: The CPU obtains the TTC of the front object based on the object information.

Step 325: The CPU determines whether or not the TTC of the front object is smaller than or equal to the start threshold time Tsth.

When the TTC of the front object is larger than the start threshold time Tsth, the CPU makes a “No” determination in step 325. Thereafter, the process proceeds to step 395, and the CPU terminates the present routine tentatively.

When the TTC of the front object is smaller than or equal to the start threshold time Tsth, the CPU makes a “Yes” determination in step 325. Thereafter, the process proceeds to step 330, and in step 330, the CPU sets the execution flag Xexe to “1”. Thereafter, the process proceeds to step 395, and the CPU terminates the present routine tentatively.

In a case where the execution flag Xexe is “1” when the process proceeds to step 310, the CPU makes a “No” determination in step 310, and the process proceeds to step 335. In step 335, the CPU determines whether or not the vehicle speed Vs is “0 km/h”.

When the vehicle speed Vs is not “0 km/h”, the CPU makes a “No” determination in step 335 and executes steps 340 and 345.

Step 340: The CPU obtains the TTC of the front object based on the object information.

Step 345: The CPU determines whether or not the TTC of the front object is larger than or equal to the end threshold time Teth.

When the TTC of the front object is smaller than the end threshold time Teth, the CPU makes a “No” determination in step 345. Thereafter, the process proceeds to step 395, and the CPU terminates the present routine tentatively.

In a case where the vehicle speed Vs is “0 km/h” when the process proceeds to step 335, the CPU makes a “Yes” determination in step 335, and the process proceeds to step 350. In step 350, the CPU sets the execution flag Xexe to “0”. Thereafter, the process proceeds to step 395, and the CPU terminates the present routine tentatively.

In a case where the TTC of the front object is larger than or equal to the end threshold time Teth when the CPU proceeds to step 345, the CPU makes a “Yes” determination in step 345 and sets the execution flag Xexe to “0” in step 350. Thereafter, the process proceeds to step 395, and the CPU terminates the present routine tentatively.

When the CPU determines that the forward object is no longer present, the CPU makes a “Yes” determination in step 345 so as to set the execution flag Xexe to “0” in step 350.

<Brake Control Routine>

When an appropriate time point has arrived, the CPU starts a process from step 400 of FIG. 4 and the process proceeds to step 405. In step 405, the CPU determines whether or not the execution flag Xexe is “1”.

When the execution flag Xexe is “0”, the CPU makes a “No” determination in step 405. Thereafter, the process proceeds to step 495, and the CPU terminates the present routine tentatively.

When the execution flag Xexe is “1”, the CPU makes a “Yes” determination in step 405, and executes steps 410 to 425.

Step 410: The CPU obtains the object information from the millimeter wave radar 22.

Step 415: The CPU obtains the target stop distance Dtgt by applying the relative speed Vr of the front object with respect to the vehicle VA to the target stop distance map MapDtgt(Vr).

Step 420: The CPU obtains the target deceleration Gtgt based on the vehicle speed Vs, the inter-vehicle distance D, and the target stop distance Dtgt.

As an example, the CPU obtains the target deceleration Gtgt by applying the vehicle speed Vs, the inter-vehicle distance D, and the target stop distance Dtgt to the following Expression (1).

$$Gtgt = \frac{Vs^2}{2(D - Dtgt)} \tag{1}$$

The Expression (1) is obtained by substituting an expression (2) into a coodinate “t” of an expression (3). The expression (2) is an expression representing a time t which it takes for the vehicle speed Vs to become “0 km/h”. The expression (3) represents that the distance which the vehicle VA travels in the time t is equal to a “distance obtained by subtracting the target stop distance Dtgt from the inter-vehicle distance D”.

$$t = Vs/Gtgt \tag{2}$$

$$D - Dtgt = Vs \times t - \frac{Gtgt \times t^2}{2} \tag{3}$$

Step 425: The CPU transmits the target deceleration Gtgt to the power management ECU30 and the brake ECU40.

Thereafter, the process proceeds to step 495, and the CPU terminates the present routine tentatively.

The assist apparatus 10 sets the target stop distance Dtgt such that the target stop distance Dtgt increases as the relative speed Vr increases. Accordingly, when the relative speed Vr is large, the possibility that the vehicle VA collides with the “rapidly decelerated front object” can be reduced, and when the relative speed Vr is small, the possibility that the vehicle VA collides with the following vehicle can be reduced.

First Modification

Figure 5:
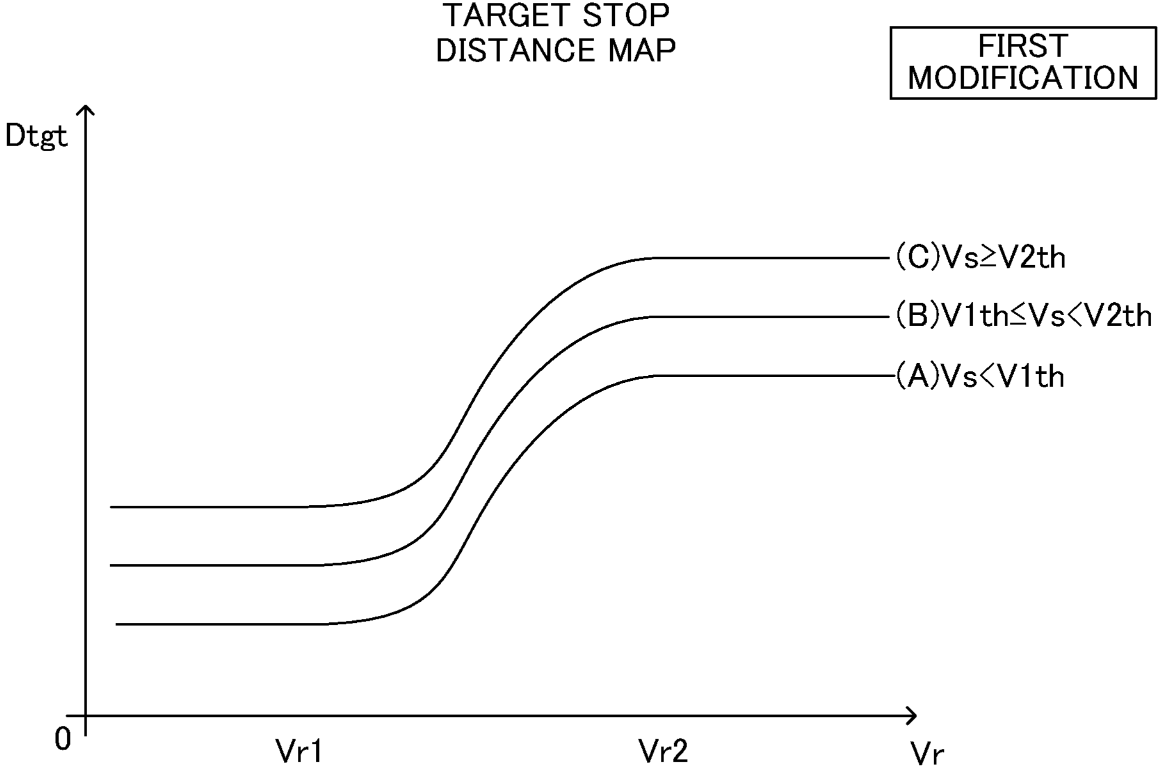
FIG. 5 is an explanatory diagram of a target stop distance map according to a first modification.

In the ROM of ECU20 according to the first modification, the target stop distance map MapDtgt(Vr) shown in FIG. 5 is stored. As illustrated in FIG. 5, the map MapDtgt(Vr) defines three relations (A) to (C) corresponding to the vehicle speed Vs. Each of the relations (A) to (C) is a relation between the relative speed Vr and the target stop distance Dtgt.

When the vehicle speed Vs is smaller than the first threshold vehicle speed V1th, the CPU obtains the target stop distance Dtgt by applying the relative speed Vr to the relation (A). When the vehicle speed Vs is equal to or larger than the first threshold vehicle speed V1th and the vehicle speed Vs is smaller than the "second threshold vehicle speed V2th larger than the first threshold vehicle speed V1th", the CPU obtains the target stop distance Dtgt by applying the relative speed Vr to the relation (B). When the vehicle speed Vs is equal to or larger than the second threshold vehicle speed V2th, the CPU obtains the target stop distance Dtgt by applying the relative speed Vr to the relation (C).

In the above relations (A) to (C), as shown in FIG. 5, the target stop distance Dtgt of the relationship (C) is the longest, the target stop distance Dtgt of the relationship (B) is the second longest after the target stop distance Dtgt of the relationship (C), and the target stop distance Dtgt of the relationship (C) is the shortest.

For example, assuming that the relative speed Vr is the same when the vehicle speed Vs is "a first value smaller than the first threshold vehicle speed V1th" and when the vehicle speed Vs is "a second value that is equal to or larger than the first threshold vehicle speed V1th and is smaller than the second threshold vehicle speed V2th", the target stop distance Dtgt is longer when the vehicle speed Vs is the second value than when the vehicle speed Vs is the first value.

Assuming that the relative speed Vr is the same when the vehicle speed Vs is large and when the vehicle speed Vs is small, a moving speed of the front object increases as the vehicle speed Vs increases. The braking distance of when the front object decelerates rapidly increases as the vehicle speed Vs increases. Therefore, in the present modification, the target stop distance Dtgt is set such that the target stop distance Dtgt increases as the vehicle speed Vs increases even in the same relative speed Vr. According to the present modification, it is possible to further reduce the possibility that the vehicle VA collides with the rapidly decelerated front object.

Second Modification

A sensor for detecting the object in front of the vehicle VA is not limited to the millimeter wave radar 22. As an example, such a sensor may be a camera. Further, the ECU20 may detect the object in front of the vehicle VA based on both information about the object detected by the camera and the object information acquired by the millimeter wave radar 22.

Third Modification

The end condition of the brake control is not limited to the conditions E1 and E2. For example, the ECU20 may determine that the end condition is satisfied when an accelerator override is detected. The ECU20 detects the accelerator override when a depression amount of an accelerator pedal (not shown) becomes equal to or larger than a threshold amount within a predetermined time period from a time point at which a depression speed of the accelerator pedal becomes equal to or larger than a threshold speed.

Fourth Modification

The relation between the target stop distance Dtgt and the relative speed Vr defined by the target stop distance map MapDtgt(Vr) is not limited to the relation illustrated in FIGS. 2 and 5, as long as this relation is a relation in which the target stop distance Dtgt increases as the relative speed Vr increases.

Fifth Modification

The assist apparatus 10 can be installed in (applied to) an engine vehicle, a hybrid electric vehicle (HEV: Hybrid Electric Vehicle), a plug-in hybrid electric vehicle (PHEV: Plug-in Hybrid Electric Vehicle), a fuel cell electric vehicle (FCEV: Fuel Cell Electric Vehicle), an electric motor vehicle (BEV: Battery Electric Vehicle), or the like. Further, the assist apparatus 10 can be installed in (applied to) an autonomous control vehicle.

The present disclosure can also be regarded as a non-transitory computer-readable medium storing a program for realizing a function of the assist apparatus 10.

What is claimed is:

1. A driving assist apparatus comprising:

a sensor for detecting an object located in front of a vehicle and moving in the same direction as the vehicle; and a controller for executing a brake control for applying a brake force to the vehicle during a time from a time point at which the obstacle satisfies a predetermined start condition to a time point at which a predetermined end condition is satisfied, wherein, the controller is configured to:

set a target stop distance such that the target stop distance increases as a relative speed of the object with respect to the vehicle increases when the controller executes the brake control; and apply the brake force so that the vehicle stops when a distance between the object and the vehicle coincides with the target stop distance, and the controller is configured to set the target stop distance such that the target stop distance is longer when a vehicle speed representing a speed of the vehicle is a first value than when the vehicle speed is a second value smaller than the first value, in a case where the relative speed when the vehicle speed is the first value is the same as the relative speed of when the vehicle speed is the second value.

2. The driving assist apparatus according to claim 1, wherein the target stop distance is a target distance of the vehicle from the object when the vehicle is stopped by the brake control.

3. The driving assist apparatus according to claim 2, wherein the controller is configured to determine a target deceleration such that the speed of the vehicle becomes 0 when the vehicle reaches the target stop distance based on the vehicle speed and a distance to the target stop distance, and apply the brake force based on the target deceleration so that the vehicle stops at the target stop distance.

4. The driving assist apparatus according to claim 3, wherein the target deceleration becomes smaller as the target stop distance becomes smaller.

5. A driving assist method to perform a brake control for applying a brake force to a vehicle during a time from a time point at which an obstacle located in front of a vehicle and moving in the same direction as the vehicle satisfies a predetermined start condition to a time point at which a predetermined end condition is satisfied, the method being executed by a computer installed on the vehicle, comprising:

a first step of setting a target stop distance such that the target stop distance increases as a relative speed of the object with respect to the vehicle increases when the brake control is being executed; and a second step of applying the brake force so that the vehicle stops when a distance between the object and the vehicle coincides with the target stop distance, wherein the first step of setting comprises setting the target stop distance such that the target stop distance is longer when a vehicle speed representing a speed of the vehicle is a first value than when the vehicle speed is a second value smaller than the first value, in a case where the relative speed of when the vehicle speed is the first value is the same as the relative speed when the vehicle speed is the second value.

6. A non-transitory computer-readable storage medium storing a program for causing a computer installed on a vehicle to execute a brake control for applying a brake force to the vehicle during a time from a time point at which an obstacle located in front of the vehicle and moving in the same direction as the vehicle satisfies a predetermined start condition to a time point at which a predetermined end condition is satisfied, the program causing the computer to implement processes of:

a first step of setting a target stop distance such that the target stop distance increases as a relative speed of the object with respect to the vehicle increases when the brake control is being executed; and a second step of applying the brake force so that the vehicle stops when a distance between the object and the vehicle coincides with the target stop distance, wherein the first step of setting comprises setting the target stop distance such that the target stop distance is longer when a vehicle speed representing a speed of the vehicle is a first value than when the vehicle speed is a second value smaller than the first value, in a case where the relative speed of when the vehicle speed is the first value is the same as the relative speed when the vehicle speed is the second value.

* * * * *